UNITED STATES PATENT OFFICE.

VICTOR LENHER, OF MADISON, WISCONSIN.

MANUFACTURE OF SELENIUM OXYCHLORID.

1,382,921.     Specification of Letters Patent.     Patented June 28, 1921.

No Drawing.     Application filed May 15, 1920. Serial No. 381,629.

*To all whom it may concern:*

Be it known that I, VICTOR LENHER, a citizen of the United States, residing at Madison, in the county of Dane and State of Wisconsin, have invented a new and useful Improvement in the Manufacture of Selenium Oxychlorid, of which the following is a specification.

This invention relates particularly to the manufacture of selenium oxychlorid (SeOCl$_2$); and the primary object is to provide a simple method of manufacturing said compound.

The present invention is in the nature of a modification of the process of manufacture disclosed in my application No. 381,628 filed on even date herewith.

I have discovered a practicable method of manufacturing selenium oxychlorid on a commercial scale, and have demonstrated that the compound possesses remarkable qualities as a solvent, and may be put to many useful purposes, including its use as a solvent for many substances or compounds for which no solvent has hitherto been known.

The product may also be employed in the practice of various novel processes, as in effecting the separation of materials, forming novel compounds, and forming old compounds by novel methods. According to the present invention, selenium oxychlorid is formed by combining water and selenium tetrachlorid (SeCl$_4$) or the constituents of selenium tetrachlorid, such as selenium and chlorin. The compound may be formed in accordance with the following equation:

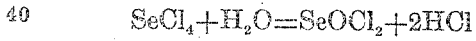
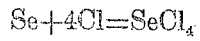
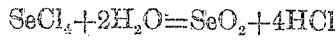

As an example of a practicable method of producing the compound, the following is given:

Mix selenium with a solvent for both chlorin and selenium oxychlorid such as carbon tetrachlorid (CCl$_4$) or chloroform (CHCl$_3$); pass chlorin gas into the mixture, thus converting the selenium first into selenium monochlorid and finally into selenium tetrachlorid (SeCl$_4$); introduce into the mixture a sufficient quantity of water to satisfy the second equation given above, *i. e.*, equi-molecular proportions of SeCl$_4$ and water, thus producing selenium oxychlorid and hydrochloric acid; and then drive off the hydrochloric acid by heat, leaving the selenium oxychlorid as a liquid. The selenium oxychlorid may be distilled and collected by means of a condenser, for purification purposes, leaving as a residuum any impurities which may be associated with the selenium. If desired, moderate heat may be applied to expedite the reaction.

It may be stated that as the selenium monochlorid is formed, it acts as a solvent for the selenium, while the original solvent, such as carbon tetrachlorid, acts as a solvent for the selenium monochlorid and as a solvent for the product selenium oxychlorid; also, selenium oxychlorid acts as a solvent for selenium tetrachlorid. Thus, the reaction is carried on in the presence of selenium oxychlorid as it is formed, this product serving as a solvent for selenium tetrachlorid. The original solvent employed, such as carbon tetrachlorid, serves to hold the selenium in suspension. If desired, stirring apparatus may be arranged for insuring the proper suspension of the selenium, or the bubbling action of chlorin gas may be depended upon to secure this result. The original solvent employed in the process may be separated from the selenium oxychlorid by evaporation and recovered for future use. If heat is employed during the reaction, it should be of a lower degree than that necessary to evaporate the original solvent or to vaporize the selenium tetrachlorid.

Water may be added either at the outset or it may be added after the selenium has been converted into selenium tetrachlorid, in which case the selenium tetrachlorid is mainly held in suspension in the carbon tetrachlorid, although a small amount of the selenium tetrachlorid may be in solution. If the water be added after the selenium tetrachlorid has been formed, the reaction may proceed in accordance with the following equations:

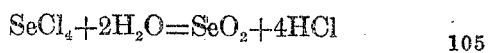

The hydrochloric acid formed in accordance with the first one of the two equations may be evaporated before performing the reaction in accordance with the last equation. It will be understood that carbon tetrachlorid or other equivalent solvent may be employed in performing the reaction indicated by the last equation as a means for holding the selenium tetrachlorid in suspension while it is being chemically combined with the selenium dioxid ($SeO_2$). The carbon tetrachlorid may then be evaporated and the selenium oxychlorid will remain as a liquid. This may be distilled for purification purposes and condensed, leaving behind as a residue any impurities associated with the selenium. The reaction in accordance with the last equation produces the selenium oxychlorid in the bath and the product acts as a solvent for the selenium tetrachlorid and the selenium dioxid, thus facilitating the reaction. The product is itself dissolved by the carbon tetrachlorid, and the separation may be effected in the manner stated.

Crude selenium may be employed in the process; or, if desired, compounds of selenium, such as iron selenid (FeSe) or copper selenid (CuSe) may be employed. For example, FeSe may be suspended in carbon tetrachlorid and chlorin gas passed therethrough, producing $Se_2Cl_2$ and $FeCl_2$ or $FeCl_3$. The $Se_2Cl_2$, that is, selenium monochlorid, may be converted into selenium tetrachlorid by continuing the chlorination process; and the necessary proportion of water may be added to effect the conversion to selenium oxychlorid. Separation of the materials may be effected in any suitable manner, it being understood that the $FeCl_2$ or $FeCl_3$ will remain as a residue.

Selenium oxychlorid is a solvent for very many substances, including certain substances or compounds for which no known solvent exists. Thus, selenium oxychlorid is a solvent for phenolic condensation products in the infusible and so-called insoluble state; is a solvent for japan; is a solvent for rubber, pure or vulcanized; is a solvent for certain metals; is a solvent for certain oxids, etc., thus making new separations possible. The use of selenium oxychlorid in the arts is unknown; and because of its remarkable qualities it will be understood that the discovery of practicable methods for its manufacture is of great importance.

The manufacture should be practised in a vessel composed of a substance which will not be attacked or dissolved by the product. Porcelain, terra cotta, or glass may be employed. If desired, a glass-lined still may be employed, and this may be fitted with stirring apparatus, if desired. The still should be equipped with suitable eduction pipes and valves to enable the original solvent, where employed, to be driven off, and to enable the selenium oxychlorid to be distilled and passed to a condenser, where purification is desired. Provision should also be made for discharging or removing any residue from the still.

The foregoing detailed description has been given for clearness of understanding only and no unnecessary limitations should be understood therefrom, but the appended claims should be construed as broadly as permissible.

What I regard as new, and desire to secure by Letters Patent, is—

1. The process of producing selenium oxychlorid which comprises chemically combining water and selenium tetrachlorid, or its constituents, the substances being taken substantially in proportions corresponding with equi-molecular parts of $SeCl_4$ and $H_2O$, the hydrochloric acid formed being eliminated in the process.

2. The process of producing selenium oxychlorid which comprises chemically combining water and selenium tetrachlorid to form selenium oxychlorid as a liquid, the constituents being taken substantially in equi-molecular proportions.

3. The process of producing selenium oxychlorid which comprises chemically combining water and selenium tetrachlorid, or its constituents, in the presence of a solvent for selenium oxychlorid which serves to hold the selenium tetrachlorid in suspension during the reaction which forms the selenium oxychlorid.

4. The process of producing selenium oxychlorid which comprises chemically combining water and ingredients comprising selenium and chlorid in proportions to afford selenium oxychlorid, the reaction being carried on in the presence of a substance which serves as a solvent both for chlorin and selenium oxychlorid.

5. The process of producing selenium oxychlorid which comprises chemically combining water and ingredients comprising selenium and chlorin, in proportions to afford selenium oxychlorid, the reaction being carried on in the presence of a solvent for both chlorin and selenium oxychlorid and in the presence of selenium oxychlorid as a liquid.

6. The process of producing selenium oxychlorid which comprises a reaction between water and a compound of selenium in the presence of a solvent for selenium oxychlorid.

7. The process of producing selenium oxychlorid which comprises causing a reaction between water and ingredients comprising selenium and chlorin in a bath comprising a solvent for chlorin and selenium oxychlorid.

8. The process of forming selenium oxychlorid which comprises: chemically combining water and selenium tetrachlorid; eliminating the hydrochloric acid formed in such reaction; and then chemically combining selenium tetrachlorid and the selenium dioxid produced in the first reaction to form selenium oxychlorid as a liquid.

9. The process of producing selenium oxychlorid which comprises forming selenium tetrachlorid in a solvent for both chlorin and selenium oxychlorid and combining with the suspended selenium tetrachlorid water in sufficient quantity to convert the same into selenium oxychlorid, the selenium oxychlorid being dissolved in said solvent; and separating from the selenium oxychlorid the hydrochloric acid formed and the solvent employed.

10. The process of producing selenium oxychlorid which comprises forming selenium tetrachlorid in a solvent for both chlorin and selenium oxychlorid and combining with the suspended selenium tetrachlorid water in sufficient quantity to convert the same into selenium oxychlorid, the selenium oxychlorid being dissolved in said solvent, evaporating said solvent; and distilling the selenium oxychlorid for purposes of purification.

VICTOR LENHER.